US006093279A

United States Patent [19]

Detterman et al.

[11] Patent Number: 6,093,279

[45] Date of Patent: Jul. 25, 2000

[54] APPARATUS FOR ATTACHING ENDSHEETS WITHOUT MOISTURE WRINKLES

[75] Inventors: Don E. Detterman, Willard; Carolyn S. Lambert, Monroeville; Jerald P. Danhoff, Attica; Jeffrey D. Habegger, Plymouth, all of Ohio

[73] Assignee: R. R. Donnelley & Sons Company, Chicago, Ill.

[21] Appl. No.: 09/154,226

[22] Filed: Sep. 16, 1998

Related U.S. Application Data

[62] Division of application No. 08/568,737, Dec. 5, 1995, Pat. No. 5,882,469.

[51] Int. Cl.[7] .................... B32B 31/00

[52] U.S. Cl. .................... 156/295; 412/8

[58] Field of Search .................... 156/295, 293, 156/304.1, 307.7, 242, 72; 412/4, 8

[56] References Cited

U.S. PATENT DOCUMENTS

| | | | |
|---|---|---|---|
| 429,562 | 6/1890 | Carpenter | 219/459 |
| 977,625 | 12/1910 | Hadaway, Jr. | 219/536 |
| 1,867,803 | 7/1932 | Bredenberg | 412/1 |
| 1,879,757 | 9/1932 | Kusch | 42/37 |
| 2,238,695 | 4/1941 | Hallman | 118/202 |
| 2,335,177 | 11/1943 | Ettl | 118/202 X |
| 2,396,946 | 3/1946 | Grupe | 118/202 X |
| 2,599,374 | 6/1952 | Davis | 118/7 |
| 2,613,375 | 10/1952 | Smith et al. | 412/28 |
| 2,671,912 | 3/1954 | Stein et al. | 412/16 |
| 3,105,133 | 9/1963 | Norton | 219/19 |
| 3,185,816 | 5/1965 | Lusebrink | 219/471 |
| 3,244,436 | 4/1966 | McKowen | 156/908 X |
| 3,278,723 | 10/1966 | Van Toorn | 219/470 |
| 3,389,684 | 6/1968 | Talbot | 118/202 |
| 3,594,837 | 7/1971 | French | 412/16 |
| 3,669,707 | 6/1972 | Donnelly et al. | 427/444 |
| 3,795,033 | 3/1974 | Donnelly et al. | 492/56 |
| 3,956,057 | 5/1976 | Jung | 156/578 |
| 3,976,814 | 8/1976 | Murphy | 427/226 |
| 3,980,514 | 9/1976 | Rosette et al. | 156/539 |
| 4,075,726 | 2/1978 | Korsgaard | 412/4 |
| 4,360,566 | 11/1982 | Shimizu et al. | 428/404 |
| 4,373,985 | 2/1983 | Glendening | 118/103 |
| 4,416,722 | 11/1983 | Bergman et al. | 156/578 |
| 4,556,353 | 12/1985 | Ehlermann | 412/5 |
| 4,588,470 | 5/1986 | Abegglen | 156/578 |
| 4,658,716 | 4/1987 | Boissevain | 100/38 |
| 4,662,979 | 5/1987 | Kupka et al. | 156/578 |
| 4,664,058 | 5/1987 | Schroeder et al. | 118/249 |
| 4,925,354 | 5/1990 | Cote | 412/8 |
| 5,074,019 | 12/1991 | Link | 492/7 |
| 5,076,891 | 12/1991 | Link et al. | 162/206 |
| 5,194,116 | 3/1993 | Davis et al. | 118/694 |
| 5,250,318 | 10/1993 | Tooker | 427/8 |
| 5,397,290 | 3/1995 | Hellenthal | 492/46 |

FOREIGN PATENT DOCUMENTS

| | | |
|---|---|---|
| 190788 | 8/1956 | Austria . |

*Primary Examiner*—Francis J. Lorin
*Attorney, Agent, or Firm*—Jenkens & Gilchrist

[57] ABSTRACT

A machine for attaching a book cover to endsheets within an adhesive is set forth. The adhesive is applied while it is within a predetermined temperature range. The machine includes a housing, an application roller journalled within the housing, and a metering roller journalled within the housing. The metering roll is axially parallel to the application roller and nearly contacts the application roller at a nip. The region above the nip defined by the application and metering rollers, and two internal seals with the housing is an adhesive reservoir. The adhesive remains in this reservoir before it is applied by the application roller. The machine also includes a level detector which detects the level of the adhesive in the adhesive reservoir. The level detector is coupled to a controller and produces a low level signal when the level of the adhesive is below a predetermined level threshold. Once this condition occurs, a transport means for transporting the adhesive from a main reservoir to the adhesive reservoir begins operation. A temperature sensor which measures the temperature of the application roller is also included. When the temperature of the application roller is below a predetermined range, heaters attached to the application roller begin operation. As such, the machine applies a hot melt adhesive within the appropriate temperature range consistently along the entire endsheets.

25 Claims, 4 Drawing Sheets

APPARATUS FOR ATTACHING ENDSHEETS WITHOUT MOISTURE WRINKLES

CROSS REFERENCES TO RELATED APPLICATIONS

This application is a divisional of U.S. Ser. No. 08/568,737, filed on Dec. 5, 1995 now U.S. Pat. No. 5,882,469.

FIELD OF THE INVENTION

The present invention relates generally to a manufacturing process of binding a book. More particularly, the invention relates to a device and a method that attaches the cover of a book to the endsheets without producing any moisture wrinkles on the pages of the book.

BACKGROUND OF THE INVENTION

The assembly of a book with a hard or flexible cover requires several distinct operations. The body of the book must first be collated into a book block to provide for proper pagination of the text. Then, endsheets are attached to the book block by methods such as adhesive binding, "Smyth" sewing, side sewing, side wire stitching or saddle stitching. The bound book block is then trimmed on three sides to provide the final size.

The book block backbone, or spine, is then reconfigured to a specific configuration such as a flatback without joints, a flatback with joints, a round configuration only, or a round configuration with joints. To retain the selected shape placed into the backbone of the book, an adhesive is typically applied followed by the application of a reinforcing woven material. This may be followed by a film of adhesive to which a liner with head bands is applied. Lastly, the book is completed by joining the endsheets to the cover.

As stated previously, numerous adhesives, such as hot melt adhesives, have been applied to the spine of the book block. This can be accomplished by an adhesive extrusion process or by running a fixed wheel through a bath of hot adhesive which then applies the adhesive to the book binding. An exemplary system which performs such a function is described in U.S. Pat. No. 5,194,116 to Davis et al. However, utilizing a hot melt adhesive to attach the cover to the endsheets is not known to have been performed.

Generally, the cover is attached to the endsheets by use of a water-based or an emulsion adhesive. A emulsion adhesive is one which has aqueous components and oil components. However, once any water is placed upon the endsheets, the first and last pages of the book back adjacent the endsheet may become exposed to the water. This is especially true if the pages of the book back have been exposed to a high temperature, low humidity atmosphere to dry the pages after ink has been applied. In this situation, the dry pages tend to pull the water from the endsheets. If the pages become wet, they become wrinkled when dried. In some situations, the aesthetically undesirable book must be scrapped or sold at a reduced cost since it is a defective product.

On the other hand, if an oil-based adhesive is used, water is not present and the likelihood of any wrinkles on the first and last pages of the book block is drastically reduced. Several systems exist which allow for the use of hot melt adhesives; but these systems have distinct disadvantages. For example, the appropriate temperature must be constantly maintained. Otherwise, application inconsistencies will occur due to the change in viscosity arising from the temperature variances. If the temperature is too hot, stringing of the adhesive can occur. If the temperature is too cold, then the adhesive tends to coagulate. Irregularity in the viscosity may even change through one application where the beginning of the run is adequate while the end of the run is inadequate. The change in temperature of the adhesive results from convection into the ambient environment which can vary a great deal in manufacturing facilities.

It would be advantageous to have a method in which endsheets could be attached without moisture wrinkle on the pages of the book block. Also, it would be desirable to have a machine available that could apply hot melt adhesives at approximately a constant temperature to the endsheet of the book block to overcome the application problems associated with hot melt adhesives. Such a machine would then achieve the desirable no-wrinkle result when used with a hot melt, oil-based adhesive.

SUMMARY OF THE INVENTION

Briefly, the present invention is directed to new and improved machine which applies hot melt adhesives to the endsheets affixed to a book block. Furthermore, a method which successfully eliminates wrinkles in the first few and last few pages of the book block is also described.

A machine for attaching a book cover to endsheets with a hot melt adhesive within a predetermined temperature range includes a housing, an application roller journalled within the housing, and a metering roller journalled within the housing. The metering roll is axially parallel to the application roller and is in contact with the application roller at a nip. The region above the nip defined by the application and metering rollers and two seals internal to the housing is an adhesive reservoir. The adhesive remains in this adhesive reservoir before it is applied by the application roller.

The machine also includes a level detector which detects the level of the adhesive in the adhesive reservoir. The level detector is coupled to a first controller and produces a low level signal when the adhesive level in the adhesive reservoir is below a predetermined level threshold. Once this condition occurs, a transport mechanism for transporting the adhesive from a main reservoir to the adhesive reservoir begins operation. This transport mechanism is also coupled to the first controller.

A temperature sensor which measures the temperature of the application roller is coupled to a second controller. When the temperature of the application roller is below a predetermined range, heaters attached to the application roller and the metering roller begin operation. The heaters are also coupled to the second controller. Typically, the heaters are attached to inner walls within the rollers and conduct the heat radially outward to the outer surface in contact with the adhesive. As such, the machine is capable of applying a hot melt adhesive within the appropriate temperature range consistently along the entire endsheets.

A method of manufacturing books which seals the endsheet of the book block to the cover without allowing water to cause wrinkles to the pages of the book back is also described. The method is accomplished by the application of a non-aqueous adhesive along the endsheets which drastically reduces the likelihood of wrinkles on these pages. If the non-aqueous adhesive must be applied at an elevated temperature, the machine described above is designed to carry out this methodology.

The above summary of the presented invention is not intended to represent each embodiment, or every aspect of the present invention. This is the purpose of the figures and detailed description which follow.

BRIEF DESCRIPTION OF THE DRAWINGS

Other objects and advantages of the invention will become apparent upon reading the following detailed description and upon reference to the drawings in which.

Figure 1:
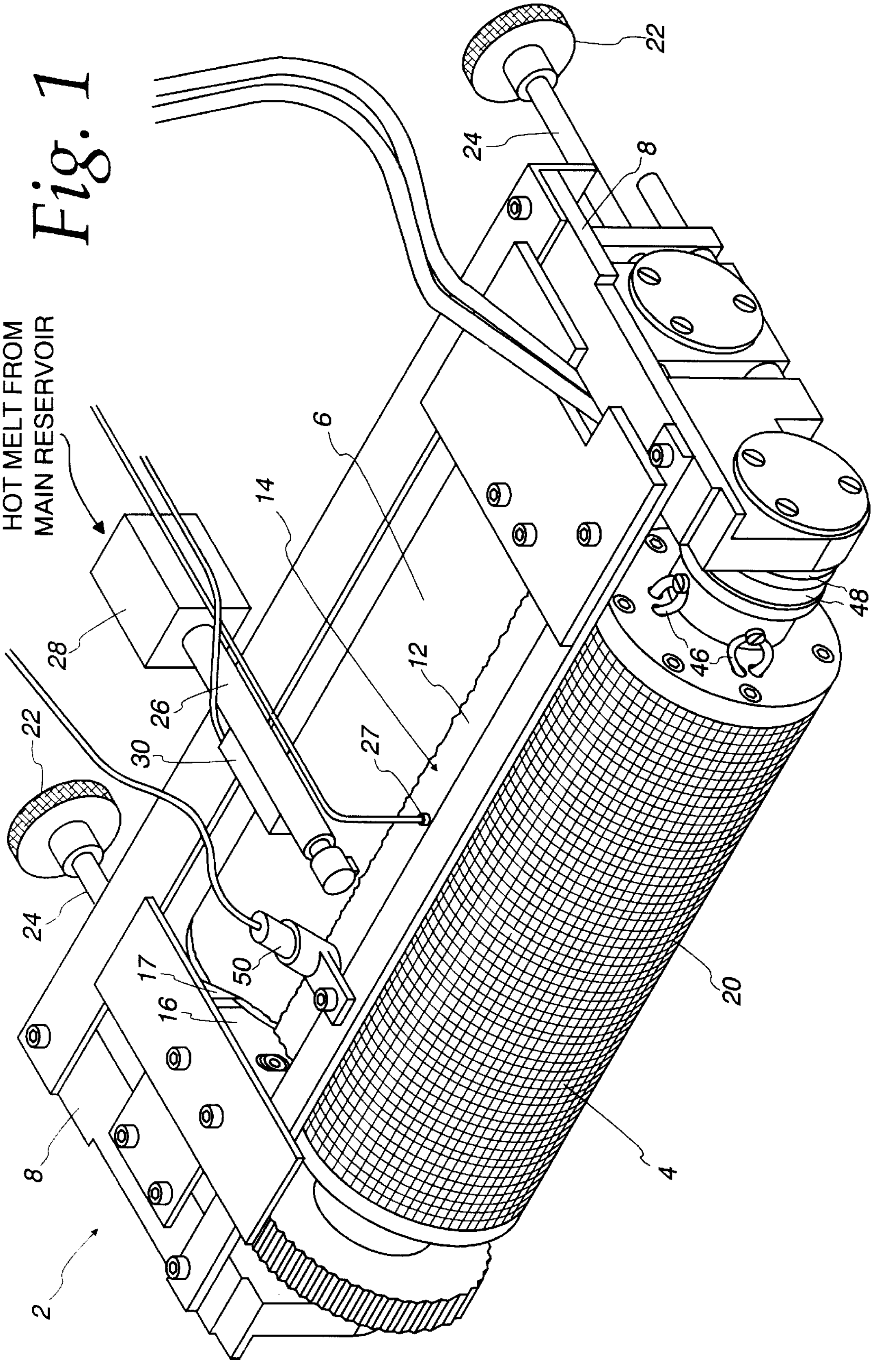
FIG. 1 is an isometric view of a machine for applying hot-melt adhesive to endsheets.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DESCRIPTION OF THE PREFERRED EMBODIMENT

Figure 2:
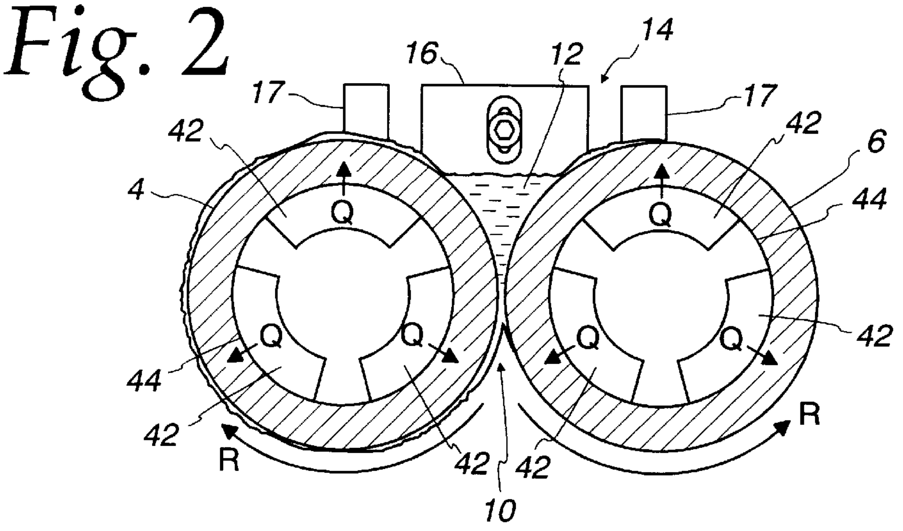
FIG. 2 is an cross-sectional view of an application roller and a metering roller of the machine in FIG. 1.
Figure 3:
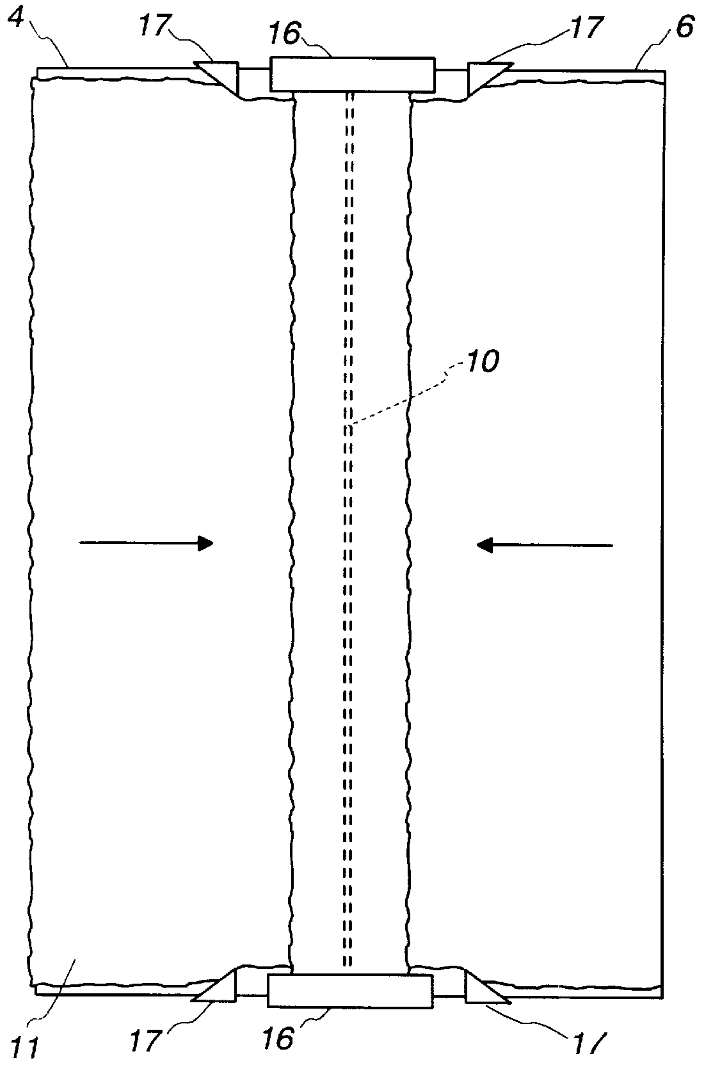
FIG. 3 is a top view of the application and metering rollers in the machine of FIG. 1.

Referring initially to FIGS. 1–3, a machine 2 is shown which applies an adhesive to endsheets attached to a book block. The machine 2 includes an application roller 4 and a metering roller 6. The application roller 4 and the metering roller 6 are journalled within the housing 8 of the machine 2 and have axes which are parallel such that the two are axially parallel. The two rollers 4 and 6 are positioned closely together, although not in contact, at a nip 10 (FIGS. 2 and 3). Adhesive 12 is maintained above the nip 10 in a adhesive reservoir 14 which is defined above the nip 10 between the application roller 4 and the metering roller 6. A pair of end seals 16, shown best in FIG. 3, ensure the adhesive 12 does not flow over the ends of the rollers 4 and 6. Additionally, a pair of scrapers 17 near the end seals 16 in FIG. 3, ensure that no adhesive 12 is located near the edge of the rollers 4 and 6 as they rotate. Otherwise, the forces on the adhesive 12 as it rotates with the rollers 4 and 6 can cause it to spread to the edge of the rollers 4 and 6 and be transferred along sides thereof.

The application roller 4 and the metering roller 6 rotate opposite to each other in a direction R. These cylindrical rollers 4 and 6 typically have the same diameters and are driven by the same motor. As such, the relative angular speed of their peripheries are generally the same. During rotation, a thin film of adhesive 12 is carried from the adhesive reservoir 12 along the outer surface of the application roller 4. To assist in the transport of the thin film of adhesive 12, the outer surface of the application roller 4 is equipped with a plurality of small pockets, or cavities 20. These cavities 20 can be in a variety of shapes including circular or polygonal and are usually a function of the process used to manufacture the cavities 20. In FIG. 1, the cavities 20 have a diamond shape. The metering roller 6 does not have small cavities because it is desirable for the metering roller 6 to not carry the adhesive 12 from the adhesive reservoir 14. As such, the metering roller 6 typically has a very polished surface.

The thickness of the film of adhesive 12 can be varied by adjusting the distance between the rollers 4 and 6 at the nip 10. This can be done in a variety of ways including a computer controlled adjusting mechanism in which the distance between the two rollers 4 and 6 is sensed and adjusted accordingly. Alternatively, a manually controlled adjustment mechanism, such as rotating knobs 22 shown in FIG. 1, can effectuate the desired movement. The knobs 22 are attached to threaded rods 24 such that one rotation of each knob 22 translates the metering roller 6 a known distance.

The adhesive 12 is supplied to the adhesive reservoir 14 from a main reservoir, which is not shown in the FIGS. 1–6, through a pipe 26. The pipe 26 has a valve 28 within it to control the flow of adhesive 12 from the main reservoir. The valve 28 is opened to permit the flow of adhesive 12 into the adhesive reservoir 14 when the level of the adhesive reservoir 14 is below a predetermined value. The level of the adhesive reservoir 14 is detected by a level sensor 27. Typically, the level sensor 27 is a temperature sensor, like a thermocouple or thermistor, which is situated at a level below which it is desirable to replenish the supply of adhesive 12 in the adhesive reservoir 14. When the level falls below this predetermined level, the temperature sensed by the temperature sensor abruptly changes from the temperature of the adhesive 12 to the localized air temperature. The level sensor 27 and the valve 28 are both coupled to a controller which is described below in detail in reference to FIG. 4. Thus, the controller actuates the valve 28 in response to the signals from level sensor 27.

Because the adhesive 12 may coagulate at temperatures below its application temperature, a pipe temperature control unit 30 comprising a heater and a temperature sensor is attached to the pipe 26. The pipe temperature control unit 30 also has a controller to provide for the actuation of the heater below a certain temperature which is described in detail in reference to FIG. 4. This ensures that the pipe 26 remains free of any obstruction caused by the solidification of the adhesive 12 within the pipe 26. Further, the pipe temperature control unit 30 guarantees the adhesive 12 is fed into the adhesive reservoir 14 at a desirable temperature. Generally, the pipeline between the main reservoir and the valve 28 has a similar temperature control unit.

Each type of adhesive 12 has a particular application temperature range at which it is best applied. Once the adhesive 12 is discharged from the pipe 26 into the adhesive reservoir 14, it is exposed to the ambient environment which is usually well below the application temperature range of the adhesive 12. Thus, heat is transferred from the adhesive 12 to the ambient air through convection. As the adhesive 12 is discharged from the opening in the pipe 26 in a stream into the adhesive reservoir 14, the velocity of the adhesive 12 relative to the ambient air creates a forced convection heat transfer scenario. Once the adhesive 12 is within the adhesive reservoir, it is again exposed to ambient air and heat is released into the air primarily through free, or natural convection which has a heat transfer coefficient that is typically much lower than in forced convection. Lastly, as the application roller 4 carries the adhesive 12 from the adhesive reservoir 14 and eventually onto the endsheets, heat is again released into the ambient air through forced convection as the ambient air rushes past the adhesive 12 as it is carried along the outer surface of the application roller 4. The total amount of energy lost by the adhesive 12 and, therefore, the reduction in its temperature after it is discharged from the pipe 26, is dependent on the amount of time between the discharge from the pipe 26 to its contact with the endsheet, the amount of surface area of the adhesive 12 exposed to the ambient environment, and the temperature difference between the ambient environment and the adhesive 12.

To assist in maintaining the adhesive 12 in the appropriate temperature range, the application roller 4 and the metering roller 6 each include a plurality of heaters 42 (FIG. 2). The heaters 42 can be positioned at various location on the rollers 4 and 6. As shown in FIG. 2, the heaters 42 can be along an internal surface 44 which defines an internal cavity within each roller 4 and 6. Typically this internal cavity is cylindrical although it could be polygonal. Clearly, only one heater 42 within each roller 4 and 6 could be employed. Preferably, each roller 4 and 6 is evenly heated by multiple heaters 42 such that each region along the outer surface of the rollers 4 and 6 is approximately isothermal. The heaters 42, which rotate with the rollers 4 and 6, include electrical leads 46 which electronically communicate with a commutator assembly 48 (FIG. 1) which permits electrical contact during rotation. The heaters 42 not only heat the adhesive 12 as it is carried to the endsheets, but they also help to add heat to the adhesive reservoir 14. In another preferable embodiment, the heaters 42 are located only within the application roller 4.

To reduce the thermal contact resistance between the heaters 42 and the internal surface 44, a thermal grease, although not shown, is typically employed therebetween. A metal foil could be equally employed to effectuate this reduction in thermal resistance. Thus, the temperature drop across the interface between the heaters 42 and the internal surface 44 is reduced to make the machine 2 more efficient.

To control the operation of the heaters 42, the temperature of the application roller 4 is monitored by a temperature sensor 50 (FIG. 1). Preferably, the temperature sensor 50 monitors the actual temperature of the application roller 4 through a non-contacting method. For example, temperature sensor 50 can be an infra-red temperature sensor which is aimed at, but not contacting, the application roller 4. Alternatively, the temperature of the adhesive reservoir 14 near the application roller 4 could be measured which is indicative of the temperature of the application roller 4.

Yet a further alternative can be accomplished by placing the temperature sensor 50 within the cavity defined by the internal surface 44 of the application roller 4 which would correspond to an external surface temperature. Such a temperature sensor 50 could even be fit into a small bore that extends radially from the internal surface 44 and terminates just short of the external surface. If the temperature sensor 50 contacts the application roller 4, then the wires from this temperature sensor 50 communicate with stationary electronics through a commutator arrangement similar to the commutator assembly 48 associated with the heaters 42. However, a controller which is coupled to the heaters 42 and the temperature sensor 50 could be placed within the cavity defined by the internal surface 44. Thus, only the power applied to the heaters 42 would enter the application roller 4 from the outside through the commutator assembly 48.

Typically, the optimum temperature of the hot melt adhesives 12 is in the range from about 300° F. to about 350° F. To maintain the adhesive roller 4 and the metering roller 6 within this temperature range, the heat Q (as shown in FIG. 2) produced by the heaters 42 in each roller 4 and 6 is generally in the range from about 500 Watts to about 1000 Watts depending on the roller length, the wall thickness, and material of the rollers 4 and 6. Common types of hot melt adhesives 12 are ethylene vinyl acetate (EVA), styrene budadiene rubber (SBR), and polyeurathane reactive (PUR). EVA, SBR, and PUR are oil-based, hot melt adhesives which release no water into the book block when the cover of the book is attached to the endsheets. This is advantageous for the reasons described above. Other types of oil-based adhesives which require no heating could also be used with the invention described herein.

Typically, the rollers 4 and 6 are made of steel or stainless steel. However, various materials could be used including, among many, aluminum. The material of the rollers 4 and 6 dictate the thermal resistance between the heaters 42 and the outer surface. Materials having a lower coefficient of thermal conductivity will have the highest resistance. Thus, these low thermal conductive materials will require more heat Q produced by the heaters 42 to effectuate the same temperature on the outer surface of the rollers 4 and 6. Rollers 4 and 6 made of copper and cuprous alloys, for example, have lower thermal resistance and are more efficient.

Figure 4:
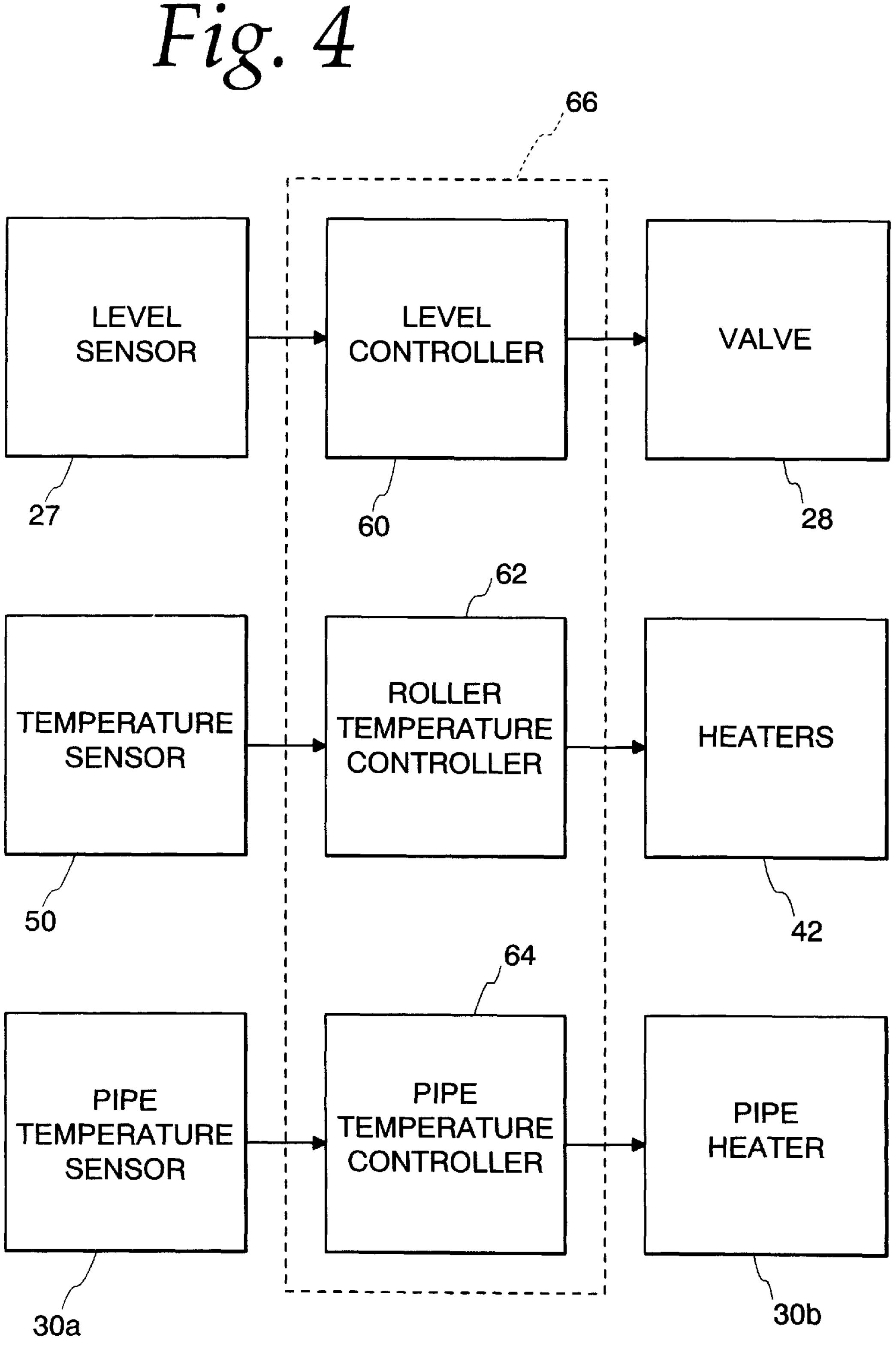
FIG. 4 is block diagram illustrating the communication between the various electronic components and a controller.

FIG. 4 illustrates a block diagram of the control systems which are employed by this machine 2. As stated above, when the level sensor 27 indicates that the level of the adhesive reservoir 14 is low, the level controller 60 receives the signal and sends a signal that actuates the valve 28. This level controller 60 can actuate the valve 28 for a set period of time (i.e. 10 seconds) in which it is assured that the amount of adhesive 12 discharged will not overfill the adhesive reservoir 14. Or, the level controller 60 could close the valve after a set period of time after the level sensor 27 indicates the level of the adhesive 12 is at least at the minimum level. Alternatively, a second level sensor 27 could be incorporated that is situated at a higher level than level sensor 27. When the valve 28 opens and adhesive 12 fills the adhesive reservoir 14, the level of the adhesive 12 soon reaches the second level sensor which then signals the level controller 60. The level controller 60 then signals to stop the flow of adhesive 12 from the valve 28. The level controller 60 subsequently awaits for a signal from the level sensor 27 which indicates the amount of adhesive 12 in the adhesive reservoir 14 is again low.

The temperature sensor 50 signals a roller temperature controller 62 when the temperature of the application roller 4 is below the desired temperature range. The roller temperature controller 62 then signals for the actuation of the heaters 42. When the heaters 42 have added enough heat Q to the rollers 4 and 6 and the temperature measured by the temperature sensor 50 achieves the upper limit of the desired temperature range, then the roller temperature controller 62 signals to terminate the power applied to the heaters 42. The roller temperature controller 62 subsequently awaits for a lower temperature signal from the temperature sensor 50.

In a similar manner as described in the preceding paragraph, the pipe temperature controller 64, by signals from the pipe temperature sensor 30*a*, controls the actuation of a pipe temperature heater 30*b*. These two components constitute the pipe temperature control unit 30 described above in reference to FIG. 1.

Although the level controller 60, the roller temperature controller 62, and the pipe temperature controller 64 are all shown as separate units, these components can be incorporated into a single control unit 66. The single control unit 66 could be in the form of a microprocessor. Also, the main reservoir from which the pipe 26 conveys the adhesive 12 may be equipped with its own control system which includes a controller which performs the function of the pipe temperature controller 64. In that case, the level controller 60 and the roller temperature controller 62 could be incorporated into one control unit 66.

Figure 5:
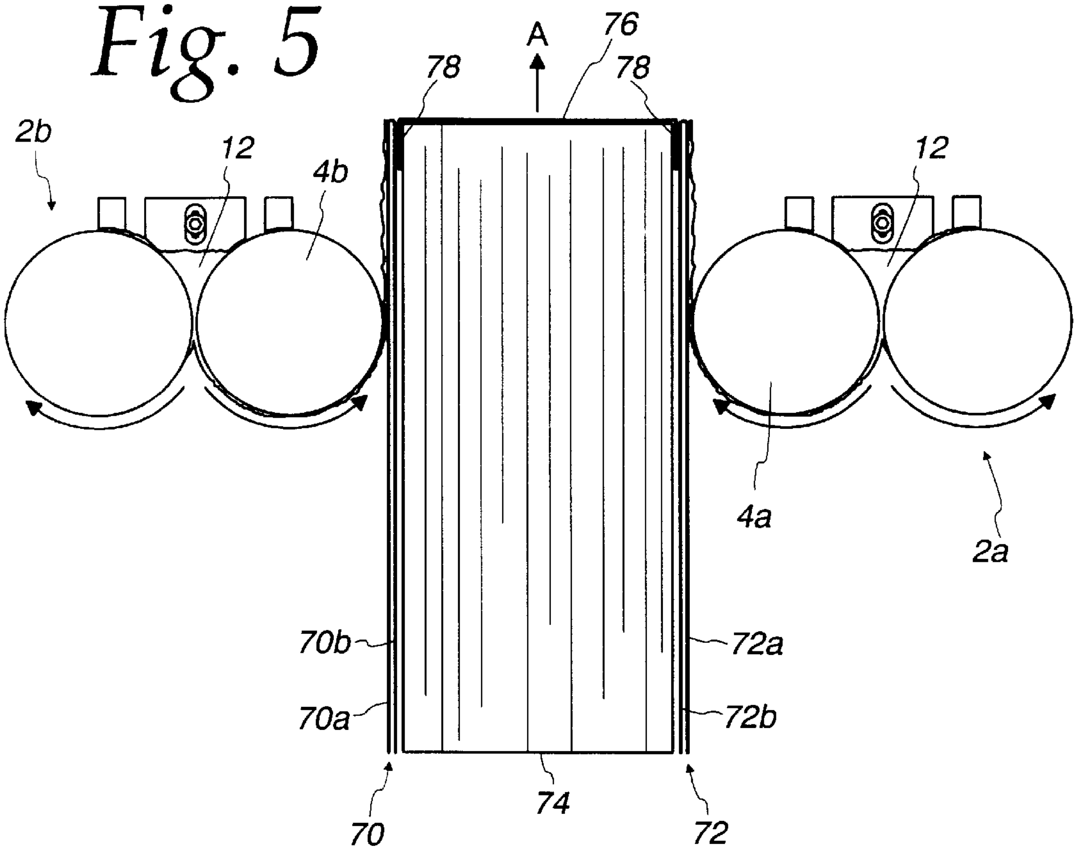
FIG. 5 is a side view of the two machines applying the adhesive to a book block.

FIG. 5 illustrates two machines 2*a* and 2*b* applying the adhesive 12 to left and right endsheets 70 and 72 which have been previously attached to a book block 74. Typically, the endsheets 70 and 72 are attached near a spine 76 of the book block 74 by an adhesive or sewing at attachment edges 78.

Left endsheet 70 has an outer portion 70*a* which faces outwardly while inner portion 70*b* faces the book block 74. Likewise, right endsheet 72 has an outer portion 72*a* which faces outwardly while inner portion 72*b* faces the book block 74. As the application rollers 4*a* and 4*b* of the two machines 2*a* and 2*b* engage the outer portion 72*a* of left endsheet 72 and the outer portion 70*a* of right endsheet 70, respectively, the application rollers 4*a* and 4*b* apply adhesive 12 thereon. As the book block 74 proceeds in an upward direction as shown by arrow A, the adhesive 12 is applied along the outer portions 72*a* and 70*a* of the endsheets 72 and 70 such that they are entirely covered. Depending on the type of book, it may be advantageous to apply adhesive to only a segment of the outer portions 70*a* and 72*a*. Typically, multiple book blocks 74 are continuously fed through the machines 2*a* and 2*b*. Although the orientation is shown with the book block 74 moving in an upward direction, clearly such movement could also be in various other directions such as downward. Also, horizontal movement of the book blocks 74 through the machines 2*a* and 2*b* is possible as well.

Figure 6:
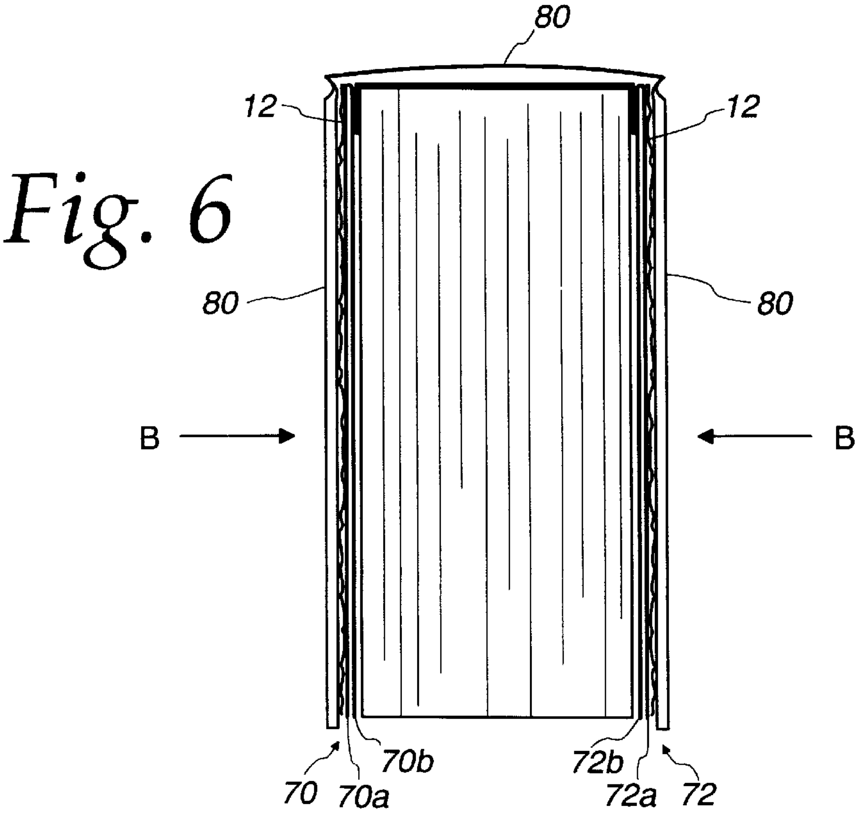
FIG. 6 is a side view of a completed book.

FIG. 6 illustrates the book block 74 after a cover 80 has been attached to the endsheets 70 and 72. The layer of adhesive 12 along the outer portions 70*a* and 72*a* of the endsheets 70 and 72 engages the inner surface of the cover 80 as the cover 80 is moved in the direction of arrows B. Typically, the entire surfaces of the outer portions 70*a* and 72*a* are covered. When the adhesive 12 is dried, the cover 80 remains affixed to the endsheets 70 and 72 which is attached to the book block 74. If the adhesive 12 is a non-aqueous adhesive, the pages of the book block 74 adjacent the endsheets 70 and 72 are not saturated with any moisture, and remain wrinkle-free.

To ensure that no wrinkles are present in the pages of the book block 74 adjacent the endsheets 70 and 72, the following method is employed. First, the sheets are printed. Often, the printed sheets are exposed to a high temperature, low humidity environment to dry the ink. Then, the plurality of printed sheets are assembled into the book block 74 and are attached near the spine 76. Endsheets 70 and 72 are then affixed to the book block 74. After attaching the endsheets 70 and 72 to the book block 74, the non-aqueous adhesive 12 is applied to the outer surfaces 70*a* and 72*a* of the endsheet 70 and 72. Typically, this is a hydro-carbon based adhesive 12. The cover 80 is then placed against the endsheets 70 and 72 wherein the non-aqueous adhesive 12 joins the outer surfaces 70*a* and 72*a* of the endsheets 70 and 72 to the cover 80. This adhesive 12 then dries and a book having wrinkle-free pages is produced. Depending on the adhesive 12 chosen, the non-aqueous adhesive 12 may have to be heated to a desired range wherein application of the adhesive 12 is optimum. When heating is required, the machine 2 described above becomes very useful to ensure that the heated adhesive 12 remains in the appropriate temperature range. Also, the entire book may then be subjected to a high-temperature, low humidity environment.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of attaching a book cover to a book block, comprising:

attaching an endsheet to said book block, said endsheet having an outer portion facing away from said book block and an inner portion facing inwardly toward said book block;

applying a single layer of a non-aqueous adhesive in liquid form to said outer portion of said endsheet; and immediately joining said book cover directly to said outer portion of said endsheet while said adhesive is still substantially in said liquid form.

2. The method of claim 1, further including heating said non-aqueous adhesive.

3. The method of claim 1, wherein said step of applying said non-aqueous adhesive entails substantially covering said outer portion of said endsheet.

4. The method of claim 1, further including exposing said book block to a high temperature, low humidity environment after placing said book cover against said outer portion of said endsheet.

5. A method of manufacturing a book comprising:

assembling a plurality of sheets to produce a book block having a spine, said book block having a unitary front sheet to be attached to a book cover;

applying a single layer of hydro-carbon based adhesive to said front sheet; and joining said book cover directly to said front sheet via said hydro-carbon based adhesive, said single layer of hydro-carbon adhesive being the only adhesive material joining said book cover to said front sheet.

6. The method of claim 5, wherein said step of applying said adhesive includes passing said front sheet by a heated roller having said adhesive on an outer surface thereof.

7. The method of claim 6, wherein said heated roller includes heating elements for maintaining said adhesive at a predetermined temperature.

8. The method of claim 7, wherein said predetermined temperature is between about 300° F. and about 350° F.

9. The method of claim 7, wherein said heating elements are positioned internally within said heated roller under said outer surface.

10. The method of claim 5, further including the step of exposing said book block to a high temperature, low-humidity environment.

11. The method of claim 7, wherein said step of joining said book cover includes the step of moving an inside surface of said book cover toward said front sheet having said adhesive.

12. The method of claim 5, further including the step of maintaining a reservoir of said adhesive at an elevated temperature.

13. A method of manufacturing a book having a book block that is substantially free of wrinkles, comprising:

assembling a plurality of sheets to produce said book block having a spine;

affixing a first unitary endsheet to a front side of said book block, said first endsheet having a first outer portion facing outwardly and a first inner portion facing inwardly toward said book block;

affixing a second unitary endsheet to a back side of said book block, said second endsheet having a second outer portion facing outwardly and a second inner portion facing inwardly toward said book block;

applying a non-aqueous adhesive to said first and second outer portions of said endsheets with a heated roller having said adhesive in liquid form on an outer surface of said roller, said roller having heating elements positioned internally within said roller under said outer surface for maintaining said adhesive within a predetermined temperature range; and attaching a book cover to said first and second outer portions of said endsheets while said adhesive is still substantially in said liquid form, said book cover having a front segment and a back segment, said front segment being attached to said first outer portion of said first endsheet, said back segment being attached to said second outer portion of said second endsheet.

14. The method of claim 13, further including the step of maintaining said non-aqueous adhesive at an elevated temperature.

15. The method of claim 14, wherein said elevated temperature is between about 300° F. and about 350° F.

16. The method of claim 14, wherein said step of maintaining said adhesive at an elevated temperature includes the step of heating an application roller contacting said non-aqueous adhesive.

17. The method of claim 13, wherein said non-aqueous adhesive is selected from the group consisting of ethylene vinyl acetate, styrene budadiene rubber, and polyeurathane reactive.

18. The method of claim 13, further including the step of exposing said book block to a high temperature, low-humidity environment.

19. The method of claim 13, wherein said step of applying said non-aqueous adhesive includes the step of covering only segments of said first and second outer portions of said endsheets.

20. The method of claim 13, wherein said step of applying said non-aqueous adhesive includes the step of completely covering said first and second outer portions of said endsheets.

21. The method of claim 13 wherein said non-aqueous adhesive is applied to said first and second outer portions of said endsheets only once.

22. The method of claim 13 wherein said non-aqueous adhesive is the only adhesive material joining said book cover to said endsheets.

23. The method of claim 1 wherein said non-aqueous adhesive is the only adhesive material joining said book cover to said endsheet.

24. The method of claim 1 wherein said non-aqueous adhesive is applied only once.

25. The method of claim 5 wherein said joining step is performed after said applying step while said adhesive is substantially in liquid form.

* * * * *